United States Patent [19]

Lehr et al.

[11] 4,418,043

[45] Nov. 29, 1983

[54] PROCESS FOR SEPARATING METALS FROM AQUEOUS SOLUTIONS

[75] Inventors: Klaus Lehr, Hürth-Knapsack; Gero Heymer, Erftstadt, both of Fed. Rep. of Germany

[73] Assignee: Hoechst Aktiengesellschaft, Fed. Rep. of Germany

[21] Appl. No.: 288,667

[22] Filed: Jul. 30, 1981

[30] Foreign Application Priority Data

Aug. 7, 1980 [DE] Fed. Rep. of Germany ....... 3029897

[51] Int. Cl.$^3$ ...................... C01G 7/00; C01G 55/00; C01G 13/00
[52] U.S. Cl. ........................................ 423/22; 423/42; 423/23; 75/109; 75/118 R; 75/121; 210/679; 210/688; 210/757; 210/912
[58] Field of Search ..................... 75/108, 109, 118 R, 75/121; 423/42, 22, 23; 210/679, 688, 757, 912

[56] References Cited

U.S. PATENT DOCUMENTS

| | | | |
|---|---|---|---|
| 1,568,464 | 1/1926 | Neill | 75/109 |
| 1,617,353 | 2/1927 | Snelling | 75/109 |
| 3,873,581 | 3/1975 | Fitzpatrick | 210/688 |
| 4,238,334 | 12/1980 | Halbfoster | 210/694 |

OTHER PUBLICATIONS

*Gmelin's Handbuch der Anorganischen Chemie*, No. 16, Verlog Chemie (1964), pp. 322–329 (Translation).

*Primary Examiner*—Edward J. Meros
*Assistant Examiner*—Robert L. Stoll
*Attorney, Agent, or Firm*—Connolly and Hutz

[57] ABSTRACT

The invention relates to a process for separating seminoble metals or noble metals from aqueous solutions having compounds of these metals dissolved therein, by reaction with yellow phosphorus. More particularly the aqueous solutions are contacted with carrier material having a yellow phosphorus coating applied thereto.

It is possible for the aqueous solutions to be conveyed through a zone having the yellow phosphorus-coated carrier material placed therein, and for them to be subsequently conveyed through a further zone having uncoated carrier material placed therein.

6 Claims, No Drawings

PROCESS FOR SEPARATING METALS FROM AQUEOUS SOLUTIONS

The present invention relates to a process for separating seminoble and/or noble metals from aqueous solutions having compounds of these metals dissolved therein by reaction of the solutions with yellow phosphorus.

It has been described that mercury compounds can be separated and more especially precipitated from aqueous solutions (cf. DE-OS Nos. 2 613 128 and 2 819 153, and DE-PS No. 2 102 900).

It has also been suggested that water-soluble mercury compounds should be separated from their aqueous solutions with the use of ion-exchangers (cf. GB-PS No. 1 545 268 and U.S. Pat. No. 3,085,859).

Dissolved heavy metal compounds of copper, silver, palladium and mercury can also be removed from aqueous solutions electrochemically with the use of solid or fluidized bed cells (cf. Chem. Ing. Tech. 50 (1978), No. 5, pages 332–337).

It is also possible for mercury compounds to be separated from dilute aqueous solutions by liquid-liquid extraction (cf. Quim. Ind. (Madrid) 1978, 24 (2), pages 137 and 139–142).

It has finally been described that waste water obtained in an alkali metal chloride electrolysis facility provided with mercury cathodes can be freed from mercury by first subjecting the waste water to treatment with sodium hypochlorite and sodium borohydride and then passing hot air therethrough whereby it is possible for the mercury content of the waste water to be lowered down to 1 ppm.

Disadvantages encountered with these prior processes reside in the fact that it is necessary for them to be carried out with the use of very expensive machinery, or that it is necessary for the waste water to be subjected to prepurification so as to remove dirt particles and oxidizing constituents therefrom, or that the heavy metal is separated from the waste water to an unsatisfactory extent only.

It is therefore an object of the present invention to provide a process for separating heavy metals, such as mercury, copper and noble metals from aqueous solutions having compounds of these metals dissolved therein, which can be carried out with little expenditure of machinery and high space time yields with formation of practically metal-free water.

The present process for separating seminoble and/or noble metals from aqueous solutions having compounds of these metals dissolved therein by reaction of the solutions with yellow phosphorus comprises contacting the aqueous solutions with a carrier material having a yellow phosphorus coating applied thereto.

Further preferred features of the process of this invention provide:

(a) for the aqueous solutions to be conveyed through a zone having the yellow phosphorus-coated carrier material placed therein;

(b) for the aqueous solutions to be subsequently conveyed through a further zone having uncoated carrier material placed therein;

(c) for active carbon to be used as the carrier material;

(d) for carbon black to be used as the carrier material;

(e) for hydrophobic silicic acid to be used as the carrier material;

(f) for a hydrophobic zeolite to be used as the carrier material;

(g) for the carrier material coated with yellow phosphorus to contain carrier and yellow phosphorus in a ratio by weight within the range (1:0.001) to (1:x), x standing for the product of the volume of pores of the carrier material in cc and density of the yellow phosphorus in grams per cc;

(h) for the carrier material to be coated with phosphorus by stirring it into a dispersion of yellow phosphorus in a liquid being at least extensively inert with respect to yellow phosphorus, at temperatures of from 45° C. up to the boiling point of the liquid;

(i) for water to be used as the inert liquid;

(k) for the carrier material to be coated with phosphorus by stirring it into a solution of yellow phosphorus in a solvent inert with respect to yellow phosphorus, an subsequently removing the solvent via the gas phase, the suspension being continuously agitated;

(l) for benzene to be used as the solvent; and (m) for carbon disulfide to be used as the solvent.

The process of the present invention can be used for the separation of metals having a positive normal potential, such as copper, silver, gold, mercury or platinum metals.

The yellow phosphorus should conveniently be dispersed in the inert liquid with the use of a high speed stirrer, or disperser or by ultra-sonic treatment.

In the process of this invention, the metals become deposited on the yellow phosphorus-coated carrier in the form of sparingly soluble material, either as elementary material or in phosphide form or in the form of compounds of a lower oxidation stage.

It is possible for the present process to be carried out discontinuously or continuously in a column in upright position packed with yellow phosphorus-coated carrier. In the event of the process being carried out continuously, it is preferable for the column to have a layer of uncoated carrier material placed in it, below the layer of yellow phosphorus-coated material therein.

EXAMPLE 1: (COMPARATIVE EXAMPLE)

A column 4 cm wide was packed with 50 g of active carbon (Epibon 693, a product of Lurgi company) which consisted of particles with a size of 250 to 500μ with a BET-surface area of 500 m$^2$/g, corresponding to a filling height of 11 cm. Mercury chloride-containing water, corresponding to 500 mg Hg$^{++}$/l, was passed through the column at a rate of 7 bed volumes per hour. Once the column was found to have been loaded with 5 g of mercury, the mercury content of the water coming therefrom increased to more than 0.01 mg/l ("break through").

EXAMPLE 2: (COMPARATIVE EXAMPLE)

The same column as in Example 1 was used. It was packed with active carbon and additionally packed with a covering layer of 9 g of yellow phosphorus granules about 2 mm in diameter. Mercury chloride-containing water, of which quantity and quality corresponded to that used in Example 1, was passed through the column. "Break through" was observed after the mercury load of the column was 3 g.

EXAMPLE 3: (ACCORDING TO INVENTION)

3 g yellow phosphorus was dispersed at 80° C. in 1500 g water by ultrasonic treatment. 50 g active carbon the same as that used in Example 1 was stirred into the dispersion, and the dispersed yellow phosphorus went on the active carbon. The active carbon so coated with yellow phosphorus was placed in a column 4 cm wide up to a filling height of 12 cm. Mercury chloride-containing water with 50 mg $Hg^{++}/l$ therein was passed through the column at a rate corresponding to 7 bed volumes per hour. The water which came from the column contained less than 0.01 mg Hg per liter until 58.5 g mercury was found to have been taken up by the packing material ("break through").

EXAMPLE 4: (ACCORDING TO INVENTION)

The procedure was as in Example 3 but placed in the column, below the layer of yellow phosphorus-coated active carbon, was a further layer of 50 g of uncoated but otherwise identical active carbon. Mercury chloride-containing water with 500 mg $Hg^{++}/l$ therein was passed through the column at a rate corresponding to 4 bed volumes per hour. The water which came from the column contained less than 0.01 mg mercury per liter until the mercury load of the column was 70.5 grams ("break through").

EXAMPLE 5: (ACCORDING TO INVENTION)

1 l water containing 5112 mg $Hg^{++}$ was placed in a 2-liter container and 2 g carbon black (a product of Union Rheinische Braunkohlenkraftstoff Aktiengesellschaft, D 5047 Wesseling) which had been coated with 1.025 g yellow phosphorus was added. After a 3-hour reaction period with agitation, only 0.056 mg mercury was found to be still present in the aqueous phase.

EXAMPLE 6: (ACCORDING TO INVENTION)

1 liter water containing 2542 mg $Ag^+$ was placed in a 2-liter container and 2 g carbon black, the same as that used in Example 5, which had been coated with 1.040 g yellow phosphorus was added. After a 3-hour reaction period with agitation, the aqueous phase was found to contain less than 1 mg silver.

EXAMPLE 7: (ACCORDING TO INVENTION)

The procedure was as in Example 6, but the water contained 4643 mg $Ag^{++}$ and the carbon black had been coated with 0.929 g yellow phosphorus. At the end of the reaction period, the aqueous phase equally contained less than 1 mg Ag.

EXAMPLE 8: (ACCORDING TO INVENTION)

1 liter water containing 750 mg $Cu^{++}$ was placed in a 2-liter container and 2 g carbon black, the same as that used in Example 5, which had been coated with 1 g yellow phosphorus was added. After a 3-hour reaction period with agitation at room temperature, the aqueous phase was found to contain less than 0.05 mg copper.

EXAMPLE 9: (ACCORDING TO INVENTION)

The procedure was as in Example 4, but an aqueous silver nitrate solution containing 50 mg $Ag^+/l$ was passed through the column. 10 g silver could be separated from the aqueous solution. The aqueous phase coming from the column contained at most 1 mg $Ag^+$ per liter.

EXAMPLE 10: (ACCORDING TO INVENTION)

3 g yellow phosphorus was dispersed at 80° C. in 1500 ml water by ultrasonic treatment. 100 g hydrophobic silicic acid with a maxium of pore radii distribution between 200 and 400 m$^{-10}$ was stirred into the dispersion, and the dispersed yellow phosphorus went on the silicic acid. The silicic acid so coated with yellow phosphorus was placed in a column 4 cm in diameter up to a filling height of 17 cm. Next, mercury chloride-containing water with 50 mg $Hg^{++}/l$ therein was passed through the column at a rate corresponding to 2 bed volumes. The water coming from the column contained less than 0.1 mg/l mercury until the mercury load of the column was 39.5 g ("break through").

EXAMPLE 11: (ACCORDING TO INVENTION)

1 g yellow phosphorus was dissolved at 60° C. in 50 ml benzene of which 35 ml was subsequently distilled off. The benzenic phosphorus solution was mixed at 45° C. with 250 ml water containing 2 g of the carbon black of Example 5. Next, the mixture was stirred for 30 minutes and residual benzene was distilled off. After cooling down to room temperature, the whole was admixed with 500 ml water containing 500 mg $Hg^{++}$. The resulting suspension was stirred for 30 minutes. The supernatant aqueous solution was found to contain less than 0.1 mg mercury per liter.

After removal of 500 ml water, a further 14 batches (each time 500 ml water with 500 mg $Hg^{++}$ therein) were treated in the manner described. After reaction, in each particular case for 30 minutes with agitation, with the yellow phosphorus-coated carbon black, the respective aqueous solution was found to contain at most 0.1 mg mercury per liter.

We claim:

1. A process for separating seminoble metals and noble metals, respectively, from aqueous solutions having compounds of these metals dissolved therein, by reaction with yellow phosphorus, which comprises conveying the aqueous solutions through a first zone and a second zone, the two zones being arranged one above the other; said first zone having carrier material coated with yellow phosphorus placed therein, the coated carrier material containing carrier and yellow phosphorus in a ratio by weight within the range (1:0.001) to (1:x), x standing for the product of the volume of pores of the carrier in cc and the density of yellow phosphorus in grams per cc.; said second zone having uncoated carrier material placed therein; and the carrier material in said two zones being selected from the group consisting of active carbon, carbon black, hydrophobic silicic acid and hydrophobic zeolites.

2. The process as claimed in claim 1, wherein the carrier material is coated with phosphorus by stirring it into a dispersion of yellow phosphorus in a liquid being at least extensively inert with respect to yellow phosphorus, at a temperature of from 45° C. up to the boiling point of the liquid.

3. The process as claimed in claim 2, wherein water is used as the inert liquid.

4. The process as claimed in claim 1, wherein the carrier material is coated with phosphorus by stirring it into a solution of yellow phosphorus in a solvent inert with respect to yellow phosphorus and subsequently removing the solvent via the gas phase, the suspension being continuously agitated.

5. The process as claimed in claim 4, wherein benzene is used as the solvent.

6. The process as claimed in claim 4, wherein carbon disulfide is used as the solvent.

* * * * *